United States Patent
Vesuna

(10) Patent No.: US 7,404,520 B2
(45) Date of Patent: Jul. 29, 2008

(54) SYSTEM AND METHOD FOR PROVIDING LOCATION INFORMATION IN TRANSACTION PROCESSING

(75) Inventor: Sarosh Vesuna, Los Altos, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/834,748

(22) Filed: Apr. 28, 2004

(65) Prior Publication Data

US 2005/0242188 A1    Nov. 3, 2005

(51) Int. Cl.
G06K 7/10 (2006.01)
G06K 9/22 (2006.01)

(52) U.S. Cl. .............................. 235/462.45; 235/462.46
(58) Field of Classification Search ............ 235/462.45, 235/462.46
See application file for complete search history.

(56) References Cited

U.S. PATENT DOCUMENTS

| | | | | |
|---|---|---|---|---|
| 5,120,942 A | * | 6/1992 | Holland et al. | 235/376 |
| 6,053,030 A | * | 4/2000 | Whynall et al. | 73/23.2 |
| 6,671,698 B2 | * | 12/2003 | Pickett et al. | 707/104.1 |
| 7,084,765 B2 | * | 8/2006 | Clapper | 340/572.1 |
| 2002/0059535 A1 | * | 5/2002 | Bekritsky et al. | 713/400 |
| 2003/0069806 A1 | * | 4/2003 | Konomi | 705/26 |

OTHER PUBLICATIONS

Copending U.S. Appl. No. 10/679,524, filed Oct. 6, 2003.
*Enhancements to the User Location and Tracking System*, by Paramvir Bahl and Venkata N. Padmanabhan, Microsoft Technical Report MSR-TR-99-12, dated Feb. 1999, published by Microsoft Research.
*User Location and Tracking in an In-Building Radio Network*, by Paramvir Bahl and Venkata N. Padmanabhan, Microsoft Technical Report MSR-TR-99-12, dated Feb. 1999, by the same authors, published by Microsoft Research.

* cited by examiner

*Primary Examiner*—Lisa M Caputo
(74) *Attorney, Agent, or Firm*—Fay Kaplun & Marcin, LLP

(57) ABSTRACT

Real time location system functionality is provided in conjunction with bar codes and other coded information devices to provide location information in transaction processing systems. A system and method of the present invention may be used to track the location of objects which are coupled to coded information devices.

12 Claims, 3 Drawing Sheets

SYSTEM AND METHOD FOR PROVIDING LOCATION INFORMATION IN TRANSACTION PROCESSING

BACKGROUND OF THE INVENTION

The present invention relates to systems and methods for transaction processing which combine bar code scanning with wireless network real time location functions to determine the location of a transaction. In particular, the present invention may be used to determine the locations of data transactions such as bar code scans or RFID reads, and as a result the locations of the items scanned.

Current transaction processing systems generally involve the use of barcode scanning or RFID reads and some form of wireless communications to transmit transaction information, either over a wireless local area network ("LAN") or over a wireless wide area network ("WAN"), or alternatively, batch mode operations that involve docking a hand-held scanning device and downloading the transactions together in batches. However, these systems are limited only to transmitting transaction information, and are not capable of determining or providing the location of a transaction.

The use of mobile data communications systems to perform location functions for locating mobile units is described in articles entitled *Enhancements to the User Location and Tracking System*, by Paramvir Bahl and Venkata N. Padmanabhan, and *User Location and Tracking in an In-Building Radio Network*, Microsoft Technical Report MSR-TR-99-12, dated February 1999, by the same authors, both published by Microsoft Research. As described therein signal strength of signals of the wireless data communications system, such as a system using the protocol of IEEE Standard 802.11, are used for locating mobile units within an area serviced by the system. Other techniques for locating mobile units using wireless data communications systems are possible.

In co-pending application Ser. No. 09/926,516, filed Nov. 14, 2001, which is owned by the assignee of the present application and fully incorporated herein by reference, there is described a system for identifying and locating wireless assets in a wireless communication network using time differences of arrivals of a communication sequence at different network receivers arranged at different locations.

In co-pending application Ser. No. 10/679,524, filed Oct. 6, 2003, which is owned by the assignee of the present application and fully incorporated herein by reference, there is described an improved method and system for locating mobile units using a wireless data communications system.

It would be advantageous to combine real time location system functions with bar code scanning, RFID reads and other transaction processing techniques to determine to the location of a transaction.

SUMMARY OF THE INVENTION

In accordance with the invention there is provided a system having a portable device for reading a machine-readable code on an item and for providing data corresponding to the machine-readable code to a computer over a wireless communications network, which system includes an object location system for locating the portable device and in which information relating to the location of the portable scanning device is provided to the computer for association with the data corresponding to the machine-readable code.

In accordance with the invention there is also provided a method for tracking the location of an object, including the steps of providing a machine-readable code on the object with corresponding code data, providing a portable reading device having a wireless radio for transmitting data over a wireless communications network, using an object location system to locate the portable reading device and provide location data corresponding to the portable reading device, reading the machine-readable code on the object using the portable reading device, providing the code data corresponding to the read machine-readable code and the location data to a computer using the wireless communications link, and associating in the computer the machine-readable code with the location data.

In accordance with the invention there is also provided a portable device for use in a system for tracking location of an object using a wireless network, the portable device including a processor, a memory, an RF radio for transmitting data over the wireless network, and a scanning device for scanning information stored in a machine-readable format, wherein the wireless network is configured to determine the location of the portable device and the scanning device is configured to scan at least one item containing information stored in a machine-readable format.

For a better understanding of the present invention, together with other and further objects, reference is made to the following description, taken in conjunction with the accompanying drawings, and its scope will be pointed out in the appended claims.

BRIEF DESCRIPTION OF THE DRAWING

Throughout the figures, unless otherwise stated, the same reference numerals and characters are used to denote like features, elements, components, or portions of the illustrated embodiments.

DETAILED DESCRIPTION OF THE INVENTION

Figure 1:
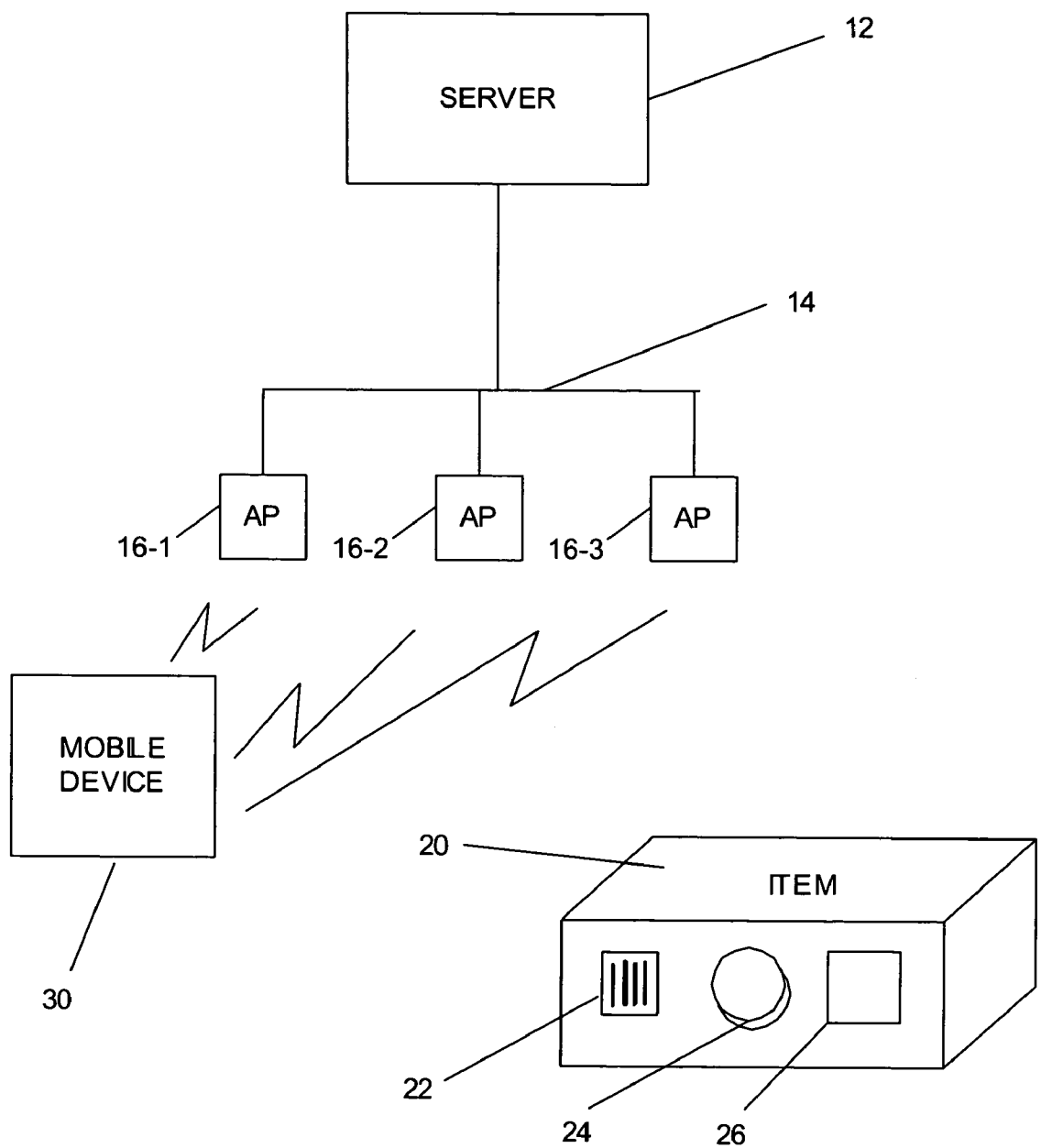
FIG. 1 is a block diagram of an exemplary wireless local area network which may be used in conjunction with the present invention.

Referring to FIG. 1, an exemplary wireless network 10 is shown, which may preferably include, for example, a network in a public location for providing content-rich mobile services to mobile device users. Wireless network 10 may preferably be a wireless WAN or alternatively may be a wireless LAN, depending upon the particular requirements and implementation of the embodiment of the present invention. In a preferred embodiment, the wireless wide area network may operate according to a standard protocol such as GPRS, or the wireless local area network may operate according to a standard protocol such as IEEE standards 802.11, 802.16, 802.20 protocols or Bluetooth protocol. It is noted that the present invention is not limited to these exemplary types of wireless networks—the present invention may be implemented in any type of wireless network.

Wireless network 10 preferably includes a server computer 12 coupled to a plurality of access points ("APs") 16. These access points are wireless access points as would normally be implemented in accordance with the selected wireless network type. In an exemplary embodiment of the present invention utilizing a GPRS wireless WAN, APs 16 may be cellular communication towers operating, for example, in the metropolitan area of a city. The access points 16 may be coupled to a server computer 12 by a link 14 which may be a standard Ethernet network cable, T-1, ISDN, Internet, or any other means for bi-directional data transmission.

Also in accordance with an exemplary embodiment of the present invention, a coded information device 22-26 is preferably affixed to an item 20. The coded information device of the present invention may be a bar code 22, an information button 24, an RFID tag 26, some combination of these, or any other device which is capable of storing data in a machine-readable format. Information buttons (or "infobuttons"), for example, are electronic devices which can store up to approximately 2K of data and which can be read using a contact reading device, which device is placed in contact with the information button to perform the reading function. Information buttons are available from, e.g., Dallas Semiconductor, and are described more fully at www.ibutton.com. Similar functionality may be provided, in accordance with the present invention, using coded information devices which are bar codes, RFID tags, infrared-readable devices, or any other device which is capable of storing data in a machine-readable format.

The information stored on coded information device 22-26 may be any information which may be required in processing a transaction with respect to the item 20. The different types of information stored will vary depending on the particular embodiment of the present invention and its intended application. For example, in one exemplary embodiment of the present invention, the types of information may include a unique identification code for the item 20, a description of the content of item 20, quantity, price, weight, origin, destination, etc. It is noted that the scope of the present invention is not limited to any particular type of information to be stored on coded information device 22-26.

Also shown in FIG. 1 is a mobile device 30 which is configured to communicate with APs 16 and further configured to read coded information devices 22-26. Mobile device 30 is now described in further detail with respect to FIG. 2.

Figure 2:
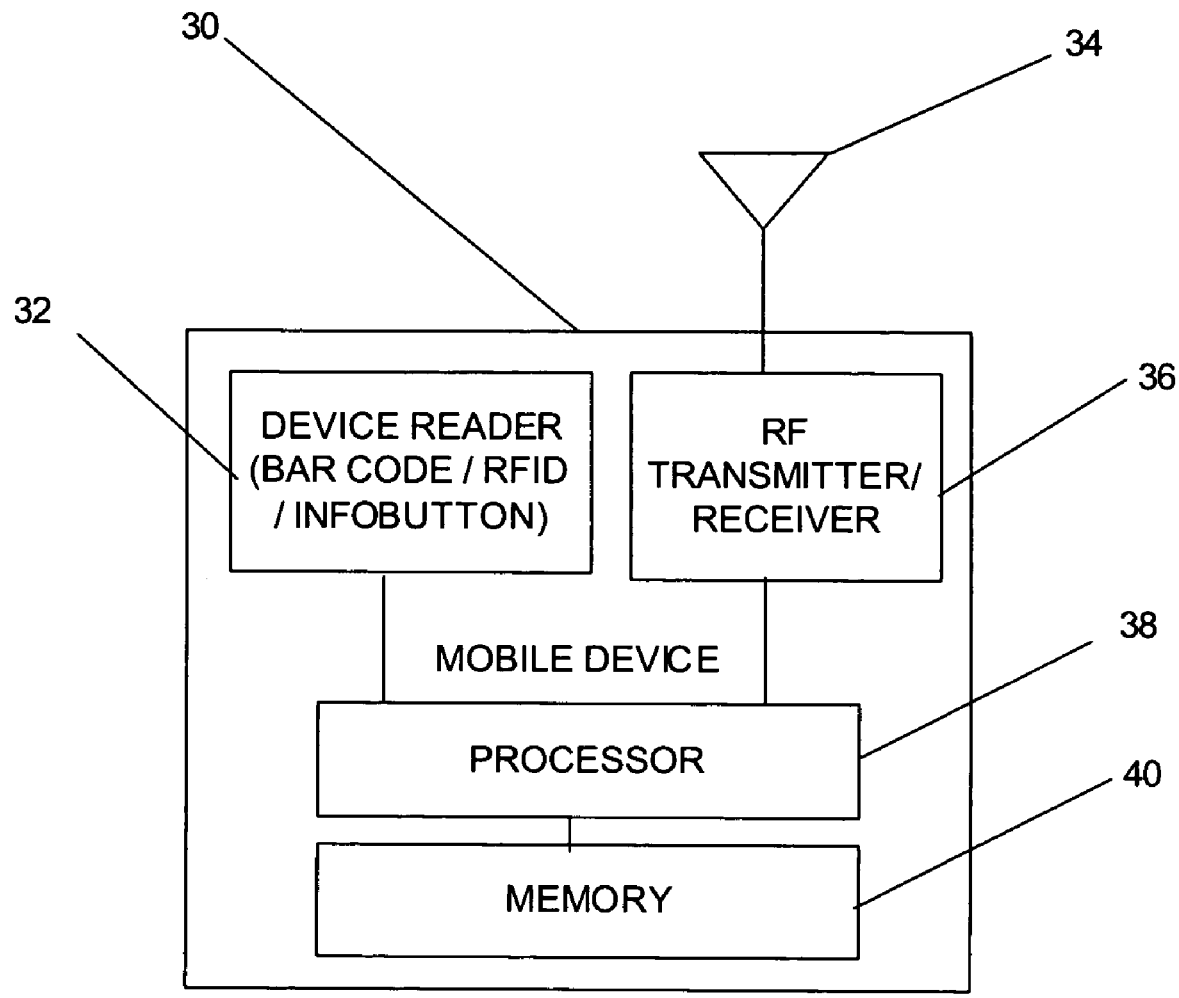
FIG. 2 is a block diagram of an exemplary mobile unit apparatus according to the present invention.

Referring to FIG. 2, an exemplary embodiment of a mobile device 30 of the present invention is shown. Mobile device 30 preferably includes a processor 38, which may be a microcontroller, microprocessor, digital signal processor, application-specific integrated circuit ("ASIC") or any other control circuit as would be known to one of ordinary skill in the art. Processor 38 may communicate with a memory 40, which may be random access memory (RAM), read-only memory (ROM), or any other type of memory which is known to one of ordinary skill in the art. Processor 38 also is preferably coupled to an RF radio 36, which may be equipped with an antenna 34 for sending and/or receiving data over the wireless network. RF radio 36 is preferably configured to communicate in accordance with the selected type of wireless area network. Depending upon the selected type of wireless network, RF radio 36 may be configured to communicate over, for example, a Wide area network, a Local Area Network or a Personal Area Network, using a GPRS radio, 802.11b radio, Bluetooth radio, respectively, or any other device capable of transmitting and receiving data on the selected type of wireless network.

Mobile device 30 is also preferably configured with a device reader 32. Device reader 32 may be one or more of a bar code scanner, RFID tag reader or Infobutton reader. For example, an information button can be used to store useful information concerning the contents of an item to which it is attached to allow a device which includes a processor coupled with an information button reader to read coded information from the coded information device. Bar codes can also be used to encode information into a format which can be read by a bar code scanner. RFID tags may preferably encapsulate this information in such manner that an RFID reader may extract the information. Alternatively, Device reader 32 may be any apparatus which is capable of reading the information stored on the coded information devices 22-26 of FIG. 1, or any other location information device used in accordance with the present invention. Notably, the RFID read functions may be performed using software which resides, for example, on a remote server.

Mobile device 30 may also be configured with a display (not shown). The display may be a standard LCD display suitable for displaying information retrieved over the wireless network. The mobile device 30 may also be configured with input apparatus to receive input from the mobile device user (not shown). The input apparatus may be touch-screen functionality in the LCD display, buttons, a text or numeric keypad, a pointer device, pen-based, or any other means for receiving user input by the mobile device 30 as would be known to one of ordinary skill in the art.

It is further noted that while mobile device 30 may be a single integrated standalone unit, it need not be. Mobile device 30 may be composed of a traditional laptop computer, personal digital assistant (PDA), handheld computer, cellular phone, or similar computing device which is configured to communicate over a wireless network, used in combination with an attached reading device capable of reading information from coded information devices 22-26, such as a handheld barcode scanner or RFID reader accessory.

In operation, device reader 32 of mobile device 30 may be used to scan a coded information device 22-26. The information scanned from coded information device 22-26 is then preferably transmitted by mobile device 30 via the wireless network to one or more APs 16. The information received by the APs may then be forwarded to a server computer 12 for storage and/or further processing. While the mobile device 30 is in or near the position where the scanning operation was performed, APs 16, in conjunction with a computer configured to perform Real-Time Location System (RTLS) functions, triangulate the position of the mobile device 30 based on techniques in the RTLS arts (for example, by utilizing a time difference of arrival algorithm to triangulate the location of mobile device 30 or based on signal strength or event trigger tied to a certain location, etc.). The server computer 12 may then associate the information scanned from coded information device 22-26 with the location determined by the RTLS operation, thus providing the location of the coded information device 22-26 and the item 20 to which it is mated.

It is noted that the RTLS calculations of the present invention may be performed by the server computer 12, in conjunction with APs 16, or by some separate RTLS server computer which is dedicated to perform such calculations. The scope of the present invention should not be limited to the particular means by which the location of mobile device 30 is calculated.

Additionally, depending on the particulars of the implementation of the present invention, the RTLS functions may be performed in various ways. For example, RTLS functions may be performed using separate RTLS transmissions from the mobile device 30, which transmissions are intended for use in determining location of the mobile device 30.

In another embodiment, RTLS functions may be performed on a regular interval using signals received from the mobile device 30 during normal network operation (e.g., status signals).

In a next embodiment, RTLS functions may be performed directly on the transmission to the wireless network of the information which was read by device reader 32. Such a configuration would provide greater efficiency in network bandwidth and power consumption by the mobile unit, since the number of RF transmissions would be minimized. Such embodiment would further ensure the greatest accuracy in the determination of the location of item 20, since the transmission and RTLS operations could be performed immediately upon scanning of the coded information device 22-26, guaranteeing that the mobile device 30 is positioned in close proximity to the item 20 at the time the RTLS operations are performed (particularly where the information devices 22-26 are close-proximity-read devices or contact-read devices such as bar codes and information buttons, respectively).

In another exemplary embodiment of the present invention, when a scan or read function is performed, mobile device 30 may be configured to attach a time-stamp to the scanned or read information so that the time of the transaction is accurately recorded. This time-stamp data may preferably be transmitted, along with the information scanned or read, over the wireless network to an AP 16, and preferably then to server computer 12.

Figure 3:
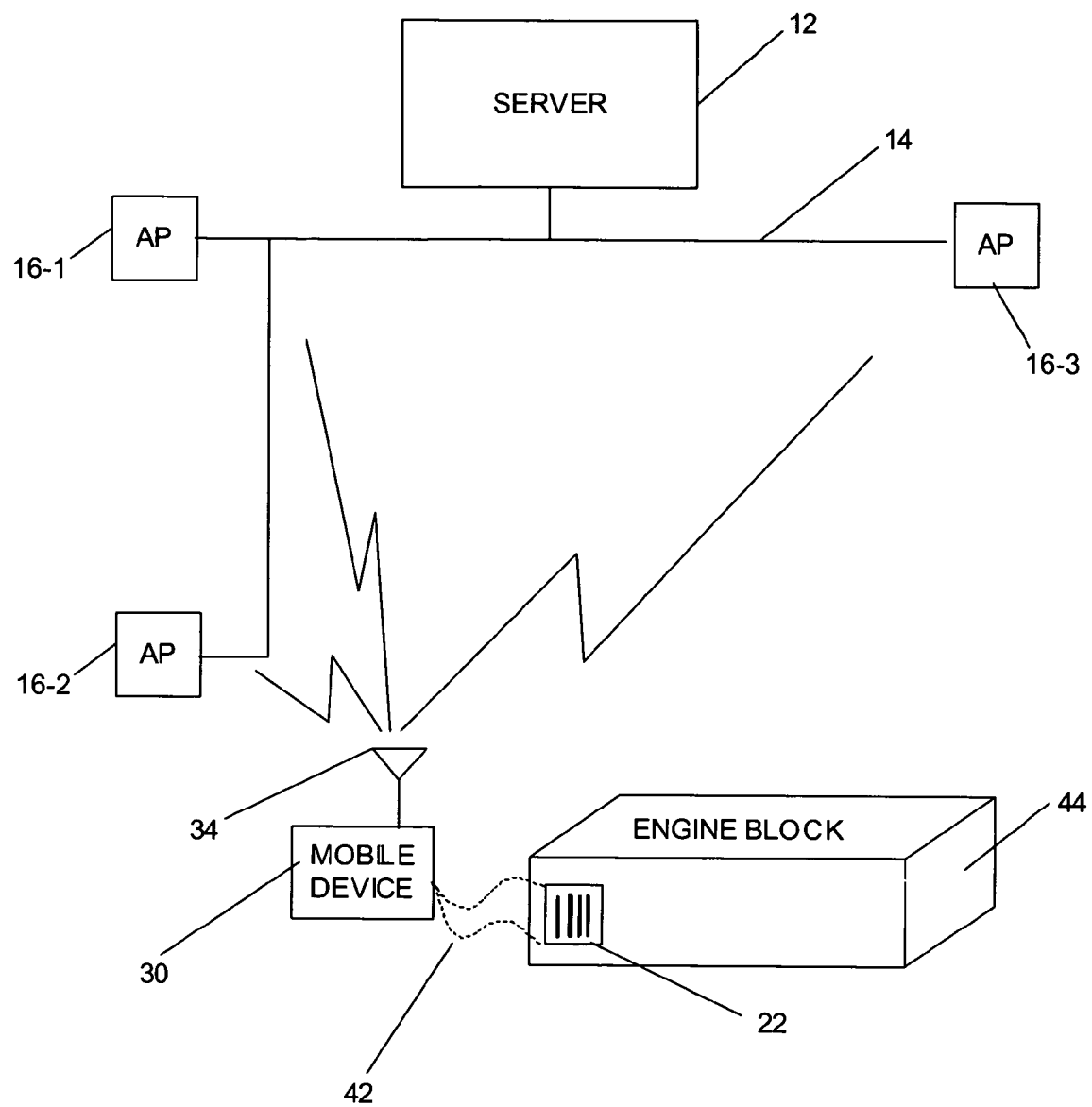
FIG. 3 is a block diagram of an exemplary embodiment of a location information system and method according to the present invention.

Referring now to FIG. 3, an exemplary embodiment of the present invention is shown as implemented in an automobile manufacturing facility. In accordance with the present invention, raw materials and parts such as engine block 44 may be tracked as they are moved through the manufacturing facility and through various phases of manufacture. In some initial phase of production, a bar code or RFID tag 22 may preferably be affixed to engine block 44 for tracking through the duration of production. Bar code 22 may preferably contain coded information which uniquely identifies engine block 44, information which identifies engine block 44 as an engine block, and/or any other information which may be useful in the particular application. As engine block 44 is moved through successive phases of production, it may be scanned 42 using a mobile device 30 which is preferably configured with a bar code reader or an RFID reader, or, in another exemplary embodiment, the engine block 44 may pass through a portal which can read the barcodes or RFID tags. After the scan 42 is performed, mobile device 30 may transmit the scanned information via antenna 34 to the wireless network. APs 16 may then receive the transmitted information and may forward the information to a server 12. As APs 16 receive the transmitted information, they may preferably be configured also to perform RTLS operations to determine the location of mobile device 30 (which, at the time of scan 42, is in close proximity to engine block 44). Server 12 may then correlate the calculated location as determined through the RTLS operations with the information scanned from bar code 22. Server 12 may preferably be coupled to a database (not shown) which may be used to associate the information read from bar code 22 on engine block 44 with a record in the database for engine block 44. In this way, server computer 12 and optional database may be used to determine and track the locations of parts such as engine block 44 as they traverse a manufacturing facility.

In another exemplary embodiment of the present invention, a system may be implemented for tracking the locations of rental cars in a rental car service facility. In such a system, identification tags may preferably be attached to rental cars to track inventory of available cars in the fleet. The identification tags may include bar codes, RFID tags, etc. An employee may traverse the parking area with a portable device of the present invention and scan each identification tag. As a tag is scanned, the location of the portable device may be determined in accordance with RTLS methodology. The scanned information may then be relayed to a central server such that a particular identification tag and car may be associated with a location in the parking area.

In yet another exemplary embodiment, the transaction processing and location system of the present invention may be implemented for package transportation/delivery and logistics. For example, the U.S. Postal Service ("U.S.P.S.") or a private parcel delivery service may implement a system and method in accordance with the present invention to track the locations of parcels as they are transferred within a facility. A WLAN may preferably be implemented, for example, at a U.S.P.S. facility such as a post office. A bar code label or stamp may be affixed on each parcel which is received by or shipped from the post office. Using a mobile device in accordance with the present invention (such as mobile device 30), a shipping clerk may scan the bar code on a given parcel in a storage room. The mobile device may then transmit the scanned information via the WLAN to a central computer, such as server computer 12. As the WLAN access points (such as APs 16) receive the data transmitted by the mobile device, the access points may preferably perform RTLS operations in order to determine the location of the mobile device 30. The location information can then be associated with the information scanned from the bar code to identify the location of the mobile device and thus the location of the parcel.

Such a system may also be implemented on a larger scale in accordance with yet another exemplary embodiment of the present invention. For example, a wireless WAN may be implemented in accordance with this embodiment of the present invention, such that similar parcel tracking functions may be provided over a larger area, for example, in a city, or even globally. The wireless WAN of this embodiment of the present invention may be some form of the Global System for Mobile Communications ("GSM") cellular networks which operate over much of the world or any Broadband Wireless Area Network, such as but not limited to IEEE 802.16. Such networks could provide large area coverage for performing RTLS operations using a variant of the mobile device of the present invention as equipped for GSM communications. Accordingly, location information in transaction processing, in accordance with the present invention, may be provided on a global scale.

While there have been described what are believed to be the preferred embodiments of the present invention, those skilled in the art will recognize that other and further changes may be made thereto without departing from the spirit of the invention, and it is intended to claim all such changes and embodiments as fall within the true scope of the invention.

I claim:

1. A method for tracking a location of an object, comprising:
    providing a machine-readable code on said object, said code having corresponding code data;
    providing a portable reading device having a wireless radio for transmitting data over a wireless communications network;
    reading said machine-readable code on said object using said portable reading device;
    using said wireless communications network to determine by triangulation the location of said portable reading device, said determination being triggered by said reading;
    providing said code data corresponding to said read machine-readable code and said location data to a computer using said wireless communications network; and associating in said computer said machine-readable code with said location data.

2. The method of claim 1 wherein said reading step further comprises recording a time-stamp.

3. The method of claim 1 wherein said portable code reading device includes a bar code scanner.

4. The method of claim 1 wherein said portable code reading device includes an RFID reader system.

5. The method of claim 1 wherein said portable code reading device includes an information button reader.

6. The method of claim 1 wherein said wireless communications network and said wireless radio operate according to an IEEE 802 protocol.

7. A system for tracking a location of an object using a wireless network, said system including a portable device comprising: a processor; a memory; an RF radio for transmitting data over said wireless network; and a scanning apparatus for scanning information stored in a machine-readable format, wherein said scanning apparatus is configured to scan at least one item containing information stored in a machine-readable format, said system triggering said wireless network to determine the location of said portable device by triangulation when said scanning apparatus scans at least one item, said wireless network associating said information corresponding to said machine readable format to said location data and storing said association.

8. The system of claim 7 wherein said scanning device is a bar code scanner.

9. The system of claim 7 wherein said scanning device is an RFID reader system.

10. The system of claim 7 wherein said scanning device is an information button reader.

11. The system of claim 7 wherein said wireless network and said RF radio operate according to an IEEE 802 protocol.

12. The system of claim 7 wherein said portable device is further configured to record a time-stamp.

* * * * *